US007768378B2

(12) United States Patent
Hill et al.

(10) Patent No.: US 7,768,378 B2

(45) Date of Patent: Aug. 3, 2010

(54) FIELD RETROFITTABLE REFRIGERATOR LOCK WITH AUDIT TRAIL

(75) Inventors: Brian R. Hill, Des Plaines, IL (US); Steven A. Belzek, Schiller Park, IL (US); Robert Brewczynski, Northlake, IL (US); Kenneth A. Kaczmarz, LaGrange Park, IL (US); Mitchell S. Mlynarczyk, Hoffman Estates, IL (US); Francis H. Zimmerman, Libertyville, IL (US); Ernest Vaughn, Waukegan, IL (US)

(73) Assignee: CompX International Inc., Mauldin, SC (US)

( * ) Notice: Subject to any disclaimer, the term of this patent is extended or adjusted under 35 U.S.C. 154(b) by 1051 days.

(21) Appl. No.: 11/411,973

(22) Filed: Apr. 26, 2006

(65) Prior Publication Data

US 2007/0257773 A1 Nov. 8, 2007

(51) Int. Cl.

*B60R 25/00* (2006.01)
*H04L 9/14* (2006.01)
*E05B 65/44* (2006.01)
*E05B 63/00* (2006.01)

(52) U.S. Cl. ......................... 340/5.73; 340/5.28; 70/81; 70/106

(58) Field of Classification Search ................ 340/5.28, 340/5.73; 70/81, 102, 106
See application file for complete search history.

(56) References Cited

U.S. PATENT DOCUMENTS

| | | | | |
|---|---|---|---|---|
| 5,520,450 | A | 5/1996 | Colson, Jr. et al. | |
| 6,112,502 | A | 9/2000 | Frederick et al. | |
| 6,741,160 | B1 * | 5/2004 | Dawson et al. | 340/5.55 |
| 6,816,075 | B2 | 11/2004 | Grunes et al. | |
| 6,879,243 | B1 * | 4/2005 | Booth et al. | 340/5.73 |
| 6,983,884 | B2 | 1/2006 | Auchinleck | |
| 2005/0146419 | A1 * | 7/2005 | Porter | 340/5.73 |
| 2006/0139148 | A1 | 6/2006 | Faro et al. | |
| 2006/0139149 | A1 | 6/2006 | Faro et al. | |
| 2007/0188303 | A1 * | 8/2007 | Faro et al. | 340/5.73 |

* cited by examiner

*Primary Examiner*—Daniel Wu
*Assistant Examiner*—Mark Rushing
(74) *Attorney, Agent, or Firm*—Dority & Manning, P.A.

(57) ABSTRACT

Disclosed is apparatus and methodology for providing a retrofittable lock assembly for an enclosure. A manually or electronically accessible lock assembly has been provided that may be attached to an enclosure to control access to items stored in the enclosure. In a particular form, the retrofittable lock may be applied to a refrigerator used to store controlled medications. The retrofittable lock contains electronic circuitry that maintains a record of user identification, date, and time of access of users seeking access to items stored in the enclosure.

23 Claims, 11 Drawing Sheets

Fig. 9b
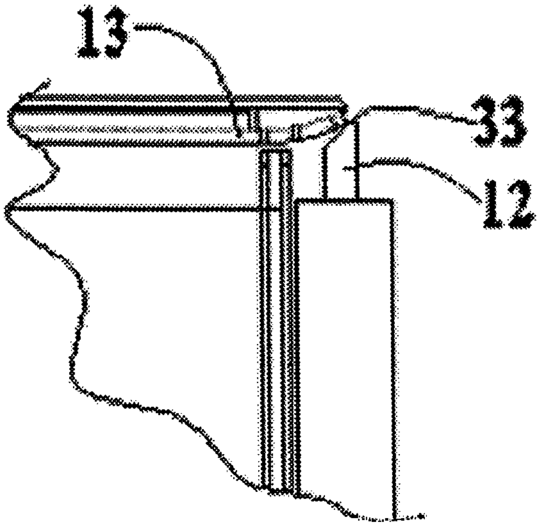
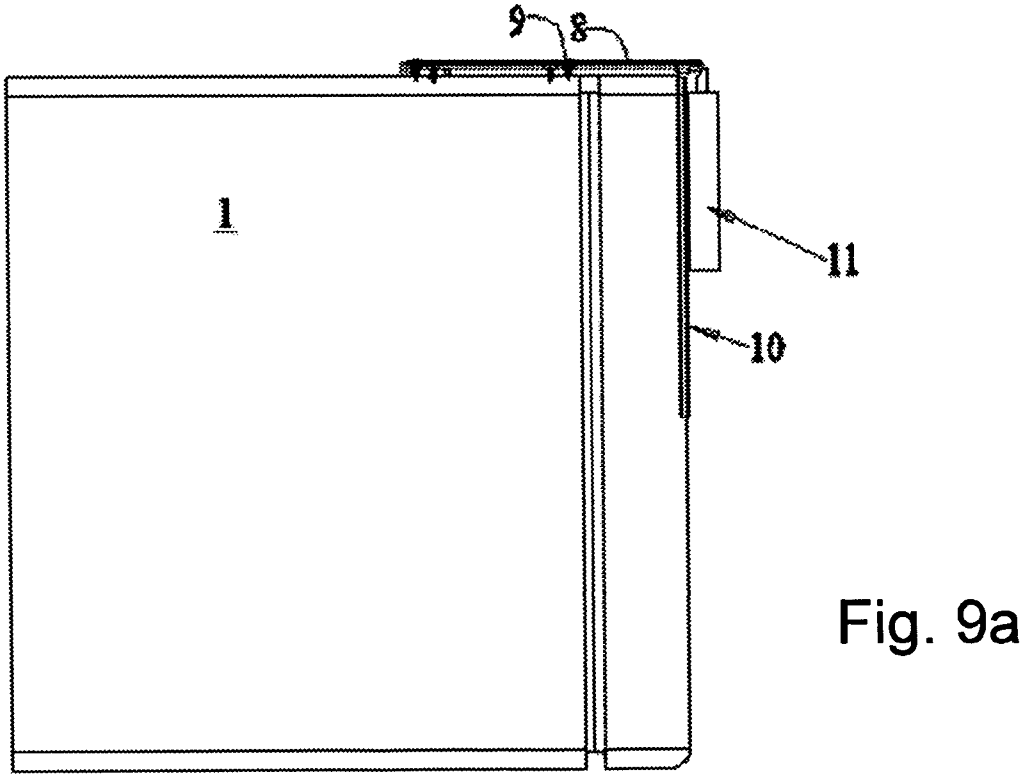
Fig. 9a

FIELD RETROFITTABLE REFRIGERATOR LOCK WITH AUDIT TRAIL

FIELD OF THE INVENTION

The present subject matter relates to door locks. More specifically, the present subject matter relates to door locks for refrigerator doors that may be applied following manufacture of the refrigerator.

BACKGROUND OF THE INVENTION

Many occasions arise where there is an identified need to store and track individual items or particular types of items. One such circumstance relates to the field of controlled medications (i.e., medicinal products) and, in particular, narcotics as may be administered to patients in a medical facility. Such medications often require refrigeration as well as secure storage. In a typical application, refrigerated narcotics are often stored in small refrigerators at nurse's stations at hospitals. Small refrigerators typically are not designed for security and therefore are not provided with any type of locking mechanism. New requirements set forth by JCAHO (Joint Commission on Accreditation of Healthcare Organizations) as well as the ever-increasing general need and desire for security dictates both securing and tracking of narcotics.

Absent such required or desired security, any person having access to the nurse's station in such circumstances can simply enter the refrigerator and remove without authorization, or steal, whatever enclosed narcotics they desire. A typical solution to this problem is to install a hasp and padlock on the refrigerator. This solution, however, may present its own problems in that padlocks may be provided with mechanical keys that may be easily lost, duplicated or stolen. When such problems occur, the padlock must be replaced and keys need to be made and distributed. This is a costly process, especially in the context of the time required to perform the distribution of the keys.

A further problem associated with such previous padlock and key security arrangement resides in the fact that since everyone having access to the padlock has a duplicate key, there is no tracking of individuals who may have opened the lock nor is there any record made as to the date and time such access occurred.

Various attempts have been previously made to monitor the activities relative to a controlled enclosure or a controlled collection of materials. See, for example, U.S. Pat. No. 6,112,502 by Frederick et al., entitled "Restocking method for medical item dispensing system"; U.S. Pat. No. 6,816,075 by Grunes et al., entitled "Evidence and property tracking for law enforcement"; U.S. Pat. No. 5,520,450 by Colson, Jr. et al., entitled "Supply station with internal computer"; and U.S. Pat. No. 6,983,884 by Auchinleck, entitled "Method and apparatus for monitoring transfusion of blood." The disclosures of all of the foregoing citations are fully incorporated herein by reference, for all purposes.

While various implementations of access control mechanisms have been developed, no design has emerged that generally encompasses all of the desired characteristics as hereafter presented in accordance with the subject technology.

SUMMARY OF THE INVENTION

In view of the recognized features encountered in the prior art and addressed by the present subject matter, an improved apparatus and methodology for providing lock assemblies is provided. In particular, retrofittable lock assemblies and related methodologies for a refrigerator (such as for use with controlled medicinal products) are provided. In an exemplary configuration, a locking mechanism constructed in accordance with the present subject matter provides an electromechanical arrangement for, retrofittable to an enclosure (such as a refrigerator) and automatically locking and unlocking a refrigerator door.

In one exemplary embodiment, a retrofittable lock assembly provided in accordance with the present subject matter provides an electronic lock operable by electronic access cards or individually assigned PIN numbers. Use of either an electronic access card or assigned PIN number may be used to provide an automatically generated audit trail of lock activity.

In accordance with certain embodiments of the present subject matter a motorized lock and accompanying electronic access circuit may be associated with a housing, that may be easily installed on the outside of a refrigerator door.

In accordance with certain aspect of other embodiments of the present subject matter, the retrofittable lock assembly may be mounted to the refrigerator door with tamper resistant sheet metal screws or double-sided tape.

Other aspects of the present subject matter involve both apparatus and methodology for providing a retrofittable lock assembly for an enclosure. In certain circumstances, either of a manually or electronically accessible lock assembly may advantageously be provided that may be attached to an enclosure to control access to items stored in the enclosure. As noted above, in a particular form, the retrofittable lock assembly apparatus may be applied to a refrigerator used to store controlled medications. Present retrofittable lock assembly subject matter may advantageously contain electronic circuitry that maintains a record of user identification, date, and time of access of users seeking access to items stored in the enclosure.

In one present exemplary embodiment, a lock assembly may include a strike plate and a housing with a latch bolt, drive motor, microprocessor and memory mounted therein. Preferably in such an arrangement, the latch bolt mounted in the housing is operatively configured to cooperate with the strike plate to inhibit relative movement between such strike plate and the latch bolt. Still further, the drive motor mounted in such exemplary housing is preferably operatively configured to retract the latch bolt into the housing to allow relative movement between the strike plate and the latch bolt. Still further, with such an exemplary present lock assembly, an access authorization circuit may be associated with the housing for receiving access authorization request data from a user. With such arrangement, data received by the access authorization circuit is verified by the microprocessor by comparing the data to a plurality of valid data sequences whereby, upon validation, the microprocessor energizes the drive motor to operate the latch bolt while it otherwise stores lock operation data in the memory.

In the foregoing exemplary lock assembly, the access authorization circuit may comprise at least one of a keypad or a proximity card reader. In either circumstance (or other, equivalent, arrangements), the access authorization circuit may be preferably configured to be responsive to data provided by one of the group consisting of magnetic stripe cards, smart cards, RF fobs, IR fobs, iButtons, and biometric readers.

Yet further in the foregoing exemplary lock assembly, a communications port may be coupled to the microprocessor and memory for exchanging data between the lock assembly and an external device, and/or with the communications port configured to transmit lock operation data stored in the memory to an external device, and/or with the communications port configured to receive lock operation data from an external device.

The foregoing lock assembly in some configurations may further comprise a gear train coupled between the drive motor and the latch bolt. In particular, such may additionally include a rack gear positioned on the side of the latch bolt, and a spring positioned to urge the latch bolt toward an extended position, such that the rack gear is configured for engagement with a final gear in the gear train and wherein the final gear includes a peripheral portion having no gear teeth whereby upon continued rotation of the final gear and upon reaching the peripheral portion having no gear teeth, the latch bolt is extended from the housing. Still further, in such exemplary lock assembly, the strike plate and the housing are configured for retrofittable installation on an enclosure having an access door to control access to the enclosure.

In another present exemplary embodiment, a lock assembly apparatus is provided for retrofittable use with an enclosure of the type for enclosing selected items, and including at least an exterior portion and an access door. Such an exemplary apparatus may include a strike plate attachable to the exterior portion of an enclosure; a housing attachable to the access door of such enclosure; a latch bolt mounted in such housing and operatively configured to cooperate with the strike plate to inhibit relative movement between the strike plate and the latch bolt; a drive motor mounted in the housing and operatively configured to retract the latch bolt into the housing to allow relative movement between the strike plate and the latch bolt; a microprocessor and a memory mounted in such housing; and an access authorization circuit associated with the housing for receiving access authorization request data from a user. In such an arrangement, data received by the access authorization circuit is verified by the microprocessor by comparing the data to a plurality of valid data sequences whereby, upon validation, the microprocessor energizes the drive motor to operate the latch bolt for movement of the strike plate for corresponding opening or closing of the access door of the enclosure. In addition, the microprocessor in some arrangements may store lock operation data in the memory to reflect an audit trail of access to selected items enclosed in such enclosure. In some configurations of the foregoing exemplary lock assembly apparatus, the enclosure may comprise a refrigerator for controlled medicinal products.

As the present subject matter pertains to corresponding methodology, one present exemplary embodiment is related to a method of controlling access to selected items, comprising the steps of: providing an enclosure for enclosing the selected items, the enclosure including at least an exterior portion and an access door; attaching a strike plate to the exterior portion; attaching a housing containing a latch bolt, a drive motor, a microprocessor, a memory, and an access authorization circuit to the access door; programming the memory with a first predetermined plurality of code sequences; providing a predetermined plurality of users access to at least one of the first predetermined plurality of code sequences; and storing data in the memory corresponding to user identification and date and time of access. With the foregoing methodology, advantageously an audit trail of access to the stored items may be maintained.

In certain exemplary arrangements, the foregoing methodology may further involve a step of providing a predetermined plurality of users access to at least one of the first predetermined plurality of code sequences by assigning a predetermined plurality of users at least one of the first predetermined plurality of code sequences for use with accessing the enclosure, such as through use of manual entries on a keypad. In some exemplary embodiments of the foregoing methodology, the enclosure may a refrigerator.

Additional objects and advantages of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIGS. 9*a* and 9*b* (with FIG. 9*b* in enlarged isolation) are side views of a lock assembly constructed in accordance with the present subject matter mounted on a refrigerator with the lock bolt hitting the strike;

Figure 1:
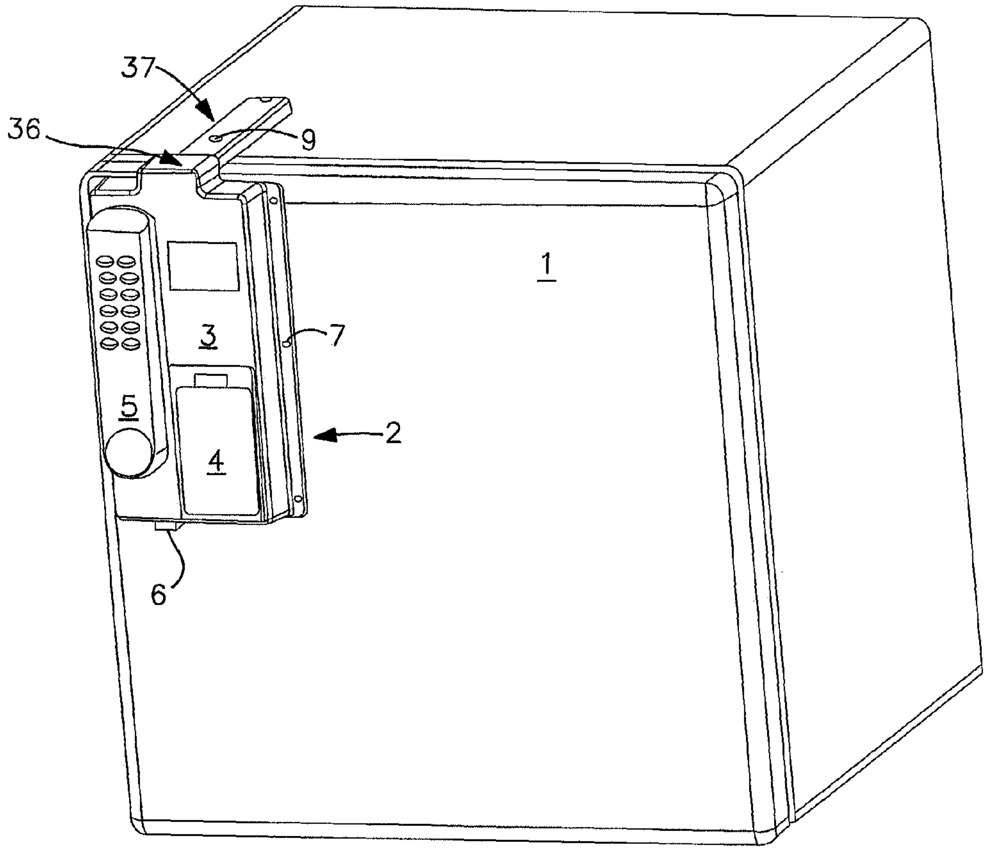
FIG. 1 is a perspective view of a refrigerator with a lock assembly constructed in accordance with the present subject matter installed on an exemplary door with such door illustrated in its closed and locked position.

Repeat use of reference characters throughout the present specification and appended drawings is intended to represent same or analogous features, elements, or steps of the present subject matter.

DETAILED DESCRIPTION OF THE PREFERRED EMBODIMENTS

As discussed in the Summary of the Invention section, the present subject matter is particularly concerned with an improved apparatus and methodology for providing retrofittable locks for a refrigerator. It should be appreciated, however, that the present subject matter is not specifically limited to the use of a retrofittable lock assembly in combination with a refrigerator. More particularly, a retrofittable lock assembly constructed in accordance with the present subject matter may be employed with many different containers over which control of access may be desired. Non-limiting examples include medical storage cabinets which do not require refrigeration of their contents, explosives cabinets, weapons cabinets, personal lockers, and general lock boxes.

A retrofittable lock constructed according to the present subject matter corresponds to an electric motor driven, secure access lock assembly. In an exemplary embodiment, the retrofittable lock assembly provides a motor/gear train assembly that turns a pinion, by way of a gear reduction assembly, which engages a rack gear on the side of a lock bolt. The rack and pinion action draws the lock bolt into the gear motor housing. The gear motor housing is attached to the inside of the main lock housing, which may be attached to the front of a refrigerator door. When the lock bolt is drawn in, it is pulled out of the strike, which may be attached to the top of the refrigerator, allowing the refrigerator to be opened. The motor is operated under control of a microprocessor based circuit and may employ a switch as a bolt position feedback sensor. Alternative bolt position feedback sensors may be employed including, but not limited to, optical sensors, Hall effect sensors, and magnetically operated reed switch sensors.

The general operation of a lock assembly constructed in accordance with the present subject matter is as follows. Normally a refrigerator equipped with a lock assembly according to the present subject matter will be locked and a nurse or other party attempting to enter the refrigerator to acquire narcotics or other stored items will begin an open cycle by entering a PIN number into the electronic lock, swipeing a magnetic stripe card through the electronic lock, or presenting a proximity card (“prox card”) to the electronic lock. It should be understood by those of ordinary skill in the art that other access control technologies can be used.

A microprocessor in the lock assembly decodes the card ID or reviews the entered PIN number. If the card or PIN is one of a plurality of valid codes, the microprocessor will turn on a motor control circuit with turns on the motor. The motor then engages a gear train which increases the torque of the motor, and reduces the motor speed. The final pinion gear in the gear train engages a rack gear on the side of the locking bolt causing the locking bolt to be drawing into the motorized latch housing.

The motorized latch is mounted inside the main lock assembly housing which may be attached to the front of the refrigerator. In the normal, i.e., locked, state, the locking bolt protrudes from the top of the lock assembly engaging a strike on top of the refrigerator. The interaction of the locking bolt and the strike keeps someone from surreptitiously gaining access to the refrigerator.

Figure 4A:
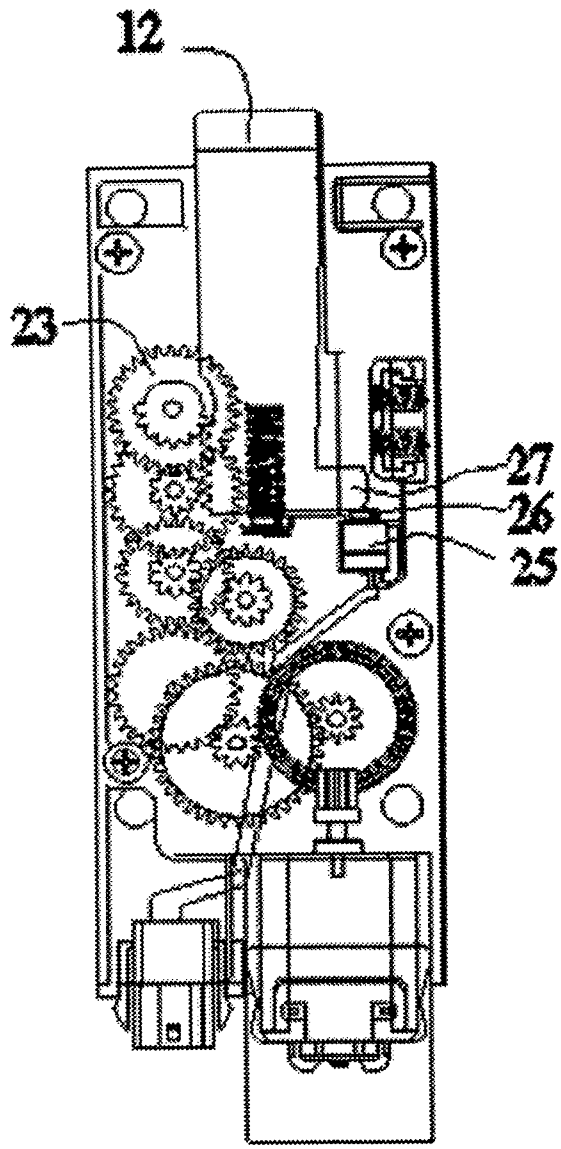
FIGS. 4*a* and 4*b* (with FIG. 4*b* in enlarged isolation) are similar to FIG. 3 illustrating a present exemplary lock bolt in a retracted position.

When the locking bolt is drawn into the motorized latch housing, it is also drawn into the main lock assembly. The locking bolt is spring loaded by a return spring, biasing the locking bolt out of the motorized latch housing. This action removes the blocking interaction between the locking bolt and the strike, allowing the nurse or other user to open the refrigerator. When the locking bolt is fully drawn into the motorized latch housing, the back end of the locking bar hits an electromechanical switch 25 (FIG. 4*a*), closing it. The state of switch 25 is constantly monitored by the microprocessor. When the microprocessor determines that switch 25 is closed, the microprocessor turns off the motor control circuit, which, in turn, turns off the motor and gear train; keeping the locking bolt drawn into the motorized latch housing. In this state, the return spring is fully charged, trying to extend the locking bolt out of the motorized latch housing.

The locking bolt remains drawn into the motorized latch housing for a programmable amount of time allowing the nurse or other user to open the refrigerator door to gain access to the contents of the refrigerator. In an exemplary embodiment, the door access time may be set to about 5 seconds, although other time delay periods are possible. After the microprocessor times out, the motor again turns on. The pinion which engages the rack on the side of the lock bolt is constructed such that only a portion of the entire diameter has gear teeth. The remainder of the diameter, of the pinion, is smooth, which will allow the rack to travel freely past the pinion.

The action of the motor turning back on brings the final tooth of the pinion to the final tooth of the rack gear, eventually falling off of the back end of the rack gear, allowing the lock assembly bolt to be uncoupled from the gear train. At this time, the return spring causes the locking bolt to extend out of the motorized latch housing, and therefore back out of the main lock assembly. Finally, this action causes the locking bolt to release switch 25 signaling the microprocessor that the locking bolt has re-extended. The microprocessor then turns off the motor control circuitry, which turns off the motor. In this state, the motorized latch assembly is decoupled from the gear train, and spring-biased out.

When the nurse or other user has completed accessing the refrigerator, the refrigerator door may be slammed close. This action will cause the locking bolt hit the strike. The end of the locking bar and the end of the strike are each provided with cam surfaces which cause the locking bolt to push into the motorized latch housing when the refrigerator door is closed. When the locking bolt pushes into the motorized housing the return spring is again charged. The strike is provided with a rectangular cutout section, located just past the cam surface that is designed so that the locking bolt will enter it as the refrigerator door closes.

After the locking bolt is pushed into the motorized latch housing and the door continues to close, the tip of the locking bolt travels on the bottom of the strike for some distance. Eventually, the tip encounters the rectangular cutout on the strike and the charged spring on the locking bolt causes the locking bar to re-extend from the motorized latch housing entering the rectangular cutout section of the strike, locking the refrigerator. The microprocessor then records the event by recording the card/pin number that accessed the refrigerator as well as the date and time. Event recording may be accomplished by storing appropriate data in a memory portion of the microprocessor or in a separate memory device for later retrieval. A separate memory device may include, but is not limited to, a removable storage device including solid state memory devices and recordable elements including magnetic and optical disks.

With more particular reference now to the figures, FIG. 1, reference numeral 1 generally designates an exemplary small refrigerator upon which a retrofittable lock assembly constructed in accordance with the present subject matter may be installed. It should be borne in mind that although the general description herein describes a lock assembly constructed according to the present subject matter as a retrofittable lock assembly, such lock assembly may, of course, be embodied as provided as original equipment directly from the manufacturer, and all such arrangements are intended to come within the spirit and scope of the present subject matter. The entire retrofittable lock assembly is generally designated with reference numeral 2. Retrofittable lock assembly 2 generally includes a main housing 3, a battery pack 4, an electronics assembly 5, and a communications port 6. The retrofittable lock assembly 2 may correspond to a plastic housing that may be easily attached to refrigerator 1 such as with a plurality of screws 7. The retrofittable lock assembly is designed to be easily mounted to most small refrigerators with minimal time, minimal tools and no refrigerator disassembly. The retrofittable lock assembly 2 engages a strike assembly 37 which, with the latch bolt, keeps the refrigerator locked. The strike assembly 37 may be attached to refrigerator 1 with a plurality of screws 9 or secured thereto by alternate means including, but not limited to, double sided tape, tamper resistant sheet metal screws, and pop rivets.

Figure 2:
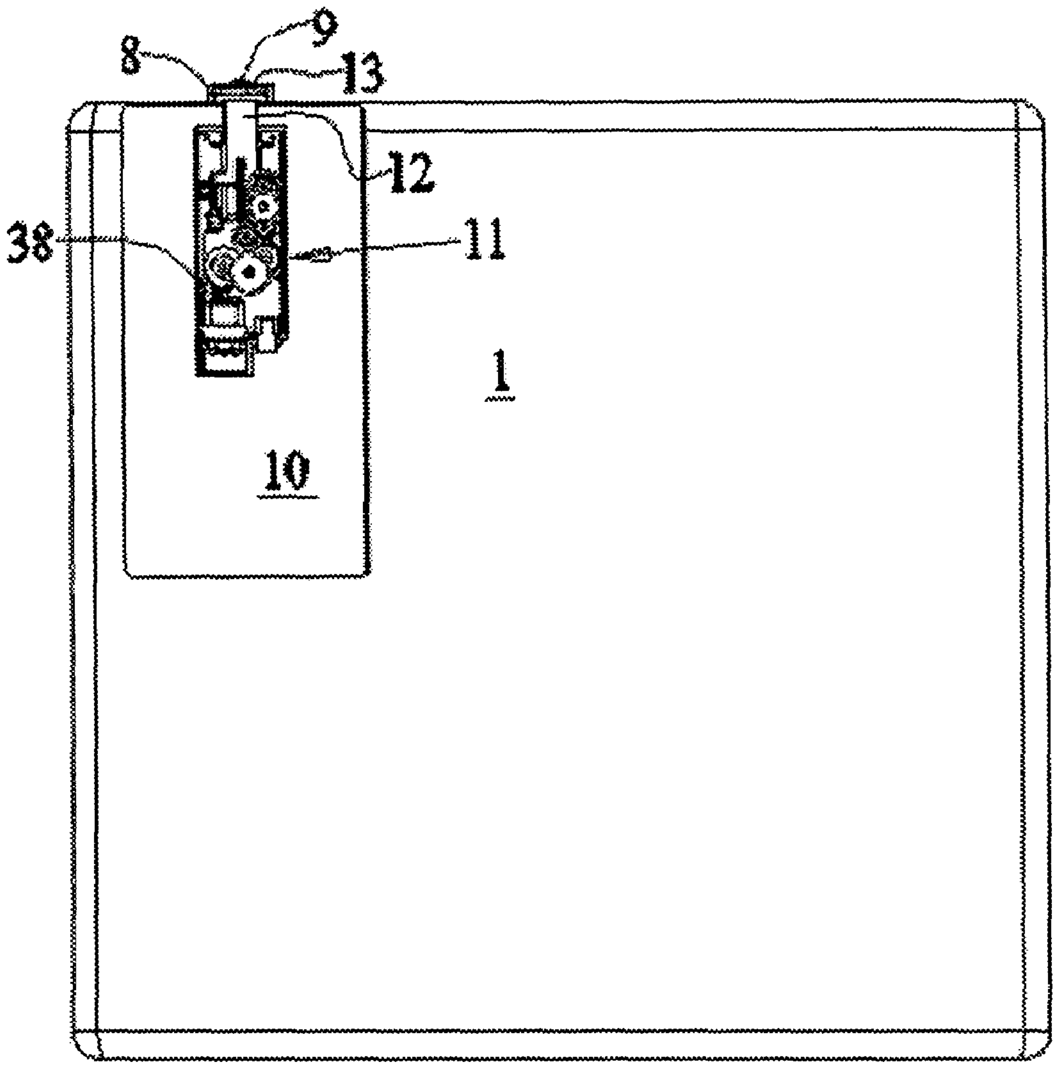
FIG. 2 is a front view of a refrigerator and installed exemplary lock assembly in accordance with the present subject matter with the lock assembly and latch cover partially cutaway and illustrating the lock bolt engaging the strike plate.

With reference now to FIG. 2, a front view of refrigerator 1 is illustrated. The main housing 3 previously illustrated in FIG. 1 has been removed to permit illustration of internal lock assembly portions. Back cover 10 is shown for reference purposes. Back cover 10 may be attached to main housing 3 with screws (not illustrated) which, in turn, may be attached to refrigerator 1 with screws 7. The main motorized latch assembly 11 may be attached to main housing 3 with a plurality of screws 38. Latch assembly 11 is provided with latch bolt 12 which engages an opening in strike plate 13 in the locked position to keep refrigerator 1 locked. Strike plate 13 may be attached to the top of the refrigerator with mounting screws (not illustrated) or by other suitable means. Strike plate 13 may be provided with a cover 8 which may be attached to strike plate 13 with a plurality of screws 9 or by other suitable means.

Figure 3:
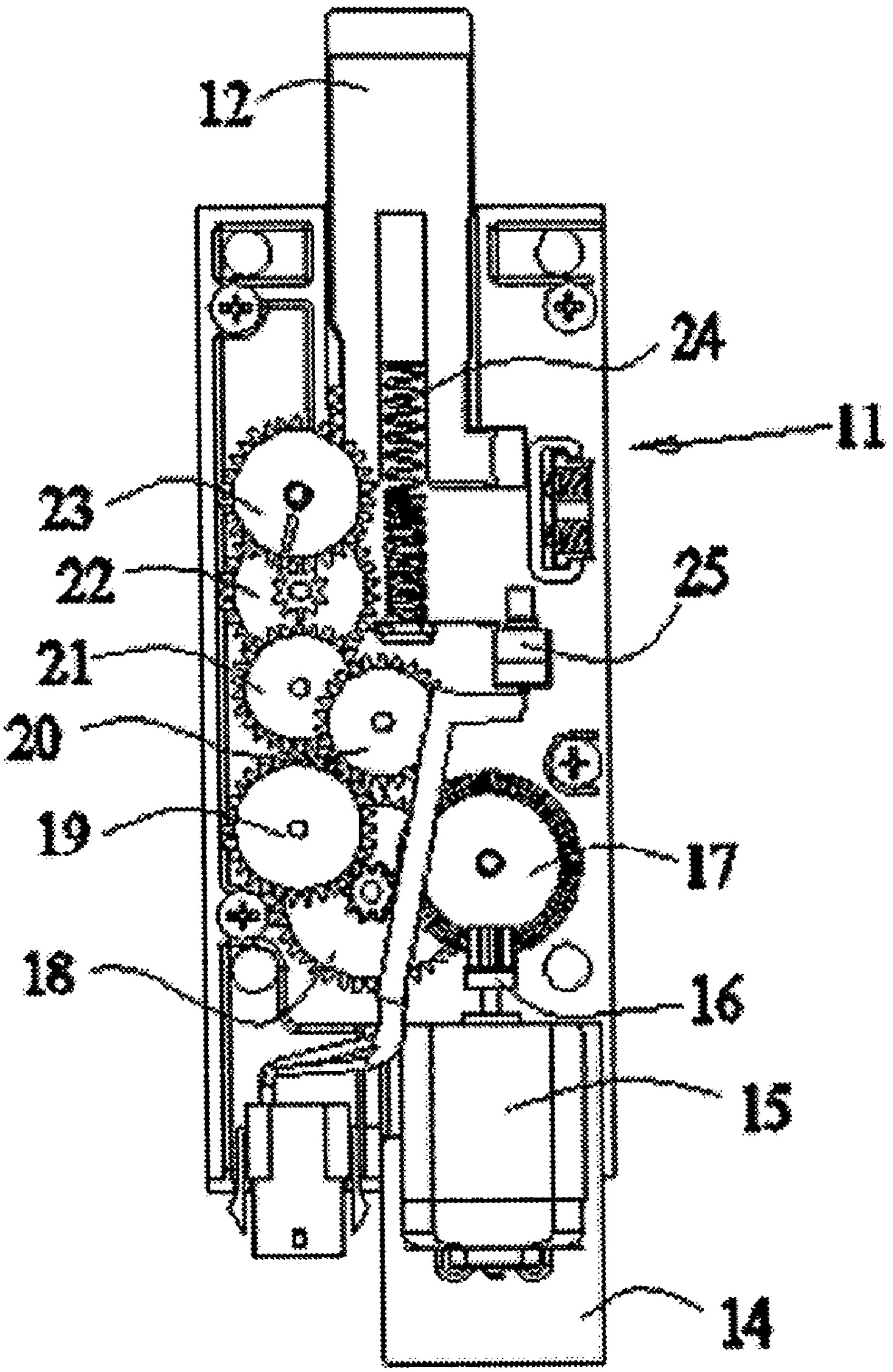
FIG. 3 is a cutaway view of a present exemplary lock assembly illustrating the internal portions of the latch with the bolt extended.

Referring now to FIG. 3, the motorized latch 11 is illustrated in greater detail. Motorized latch 11 comprises multiple cooperating parts whose collective purpose is to controllably retract latch bolt 12. It should be appreciated that the motorized latch 11 illustrated is representative only and that numerous different mechanisms can be used to accomplish the desired result of retracting bolt 12 into the motorized latch 11.

Begin referring to additional figures, such as FIG. 3. The prime mover in exemplary motorized latch 11 is motor 15. In this embodiment, motor 15 may be a permanent magnet DC motor; however, various types of motors can be employed. Motor 15 is provided with pinion gear 16 which is pressed onto the drive shaft of motor 15. Pinion 16 is coupled with crown gear 17 which rides on a shaft attached to motorized latch housing 14. Crown gear 17 engages a gear train made up of reduction gears 18, 19, 20, 21, 22, and 23. This gear train works to reduce the speed of a shaft associated with motor 15 and, therefore, substantially increase the output torque.

The final gear of the gear train, gear 23, engages a rack gear on the side of latch bolt 12 retracting latch bolt 12 into the motorized latch 11 to release the engagement of latch bolt 12 with strike 13 as noted in FIG. 2. When latch bolt 12 is retracted, spring 24 becomes charged, which, upon gear train disengagement, will extend latch bolt 12 back out of motorized latch 11.

Motor 15 is under the control of a microprocessor based circuit located within electronics assembly 5. In an exemplary embodiment, electronics assembly 5 receives input from a keypad wherein individual keys may be pressed by the user when wishing to gain access to the refrigerator. While the present exemplary embodiment illustrates the use of a keypad, it should be borne in mind that a variety of different types of access control credentials can be used instead of the illustrated keypad. These include, but are not limited to, proximity cards, magnetic stripe cards, smart cards, radio frequency (RF) fobs, infrared (IR) fobs, "iButtons," as well as a large number of biometric type access control technologies currently available.

When the electronics assembly 5 receives data, in this case a personal identification number (PIN) from the user, it processes the PIN and determines if the code is valid. Typically, electronics assemblies of this type may support a large number of valid codes, and are well understood to those of ordinary skill in the art. In an exemplary embodiment of the present subject matter, 250 valid code combinations may be provided. The electronics assembly 5 is configured to compare a PIN entered by a user to its list of pre-programmed valid codes, and if the PIN matches a valid code, the electronics assembly 5 turns on motor 15 to operate the lock assembly. Electronics assembly 5 has the capability of providing access by a plurality of different users and provides a full audit trail of lock activity for each user. The control electronics will remember an "audit trail." In accordance with the present subject matter, an "audit trail" may correspond to the card or PIN number used to gained access as well as the date and the time of access. A significant history can be developed, limited only by the capacity of the memory device associated with the microprocessor.

Data from the stored audit trail may be accessed by way of communications port 6. In addition, communications port 6 may be used for general data exchange between the lock assembly and an external device. Exemplary such data exchange may include uploading valid access authorization sequences as well as providing date and time setting functions for time keeping operations associated with the microprocessor. In an exemplary embodiment, communications port 6 may correspond to a wired RJ11 connector commonly used for telephone line connections. It should be kept in mind, however, that the present subject matter is not so limited as the communications port 6 may correspond to any available type connection including both wired and wireless connections. Such connection methodologies include, but are not limited to, optical, WiFi, Bluetooth, USB, and serial connections. The foregoing internal aspects of the electronics assembly 5 portion of the present subject matter are well known to those of ordinary skill in the art and require no further, more detailed, explanation here for a complete understanding of the present subject matter.

Figure 4B:
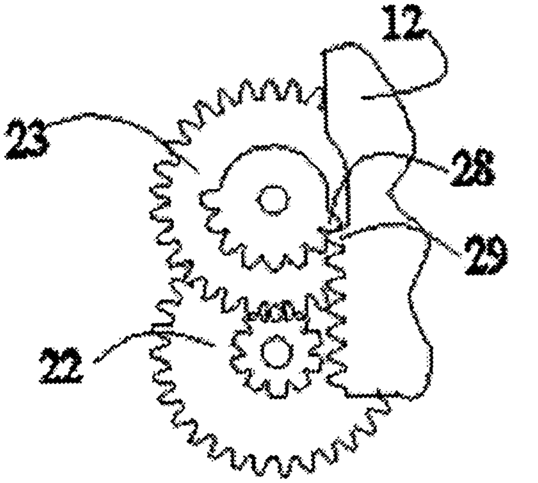

Operation of motor 15 powers gear train 16, 17, 18, 19, 20, 21, 22, 23 whose final gear, gear 23, engages a rack gear on the side of latch bolt 12. Motorized latch 11 is also provided with an internal limit switch 25 whose state (open/closed) is constantly monitored by the microprocessor in electronics assembly 5. Limit switch 25 includes an actuator 26 (FIG. 4*a*) which closes switch 26 when end 27 of latch bolt 12 contacts actuator 26. This state occurs when latch bolt 12 is fully retraced into motorized latch 11. As illustrated in FIG. 4*b*, simultaneously with the closure of switch 25, final tooth 28 of sector gear 23 engages final tooth 29 of the rack gear on the side of latch bolt 12. The lock assembly system is now in the unlocked state. Motor 15 will remain in the un-energized state while the processor times out a pre-programmed open time.

Figure 5B:
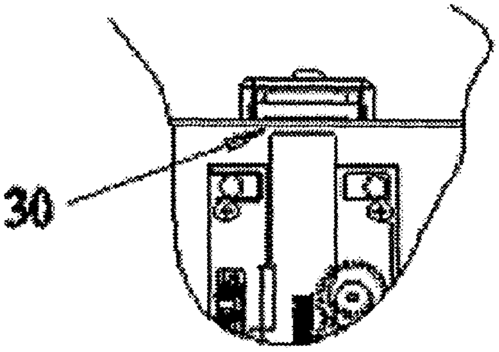
FIGS. 5*a* and 5*b* (with FIG. 5*b* in enlarged, partial cutaway isolation) are similar to FIG. 2 illustrating a present exemplary lock bolt in a retracted position.
Figure 5A:
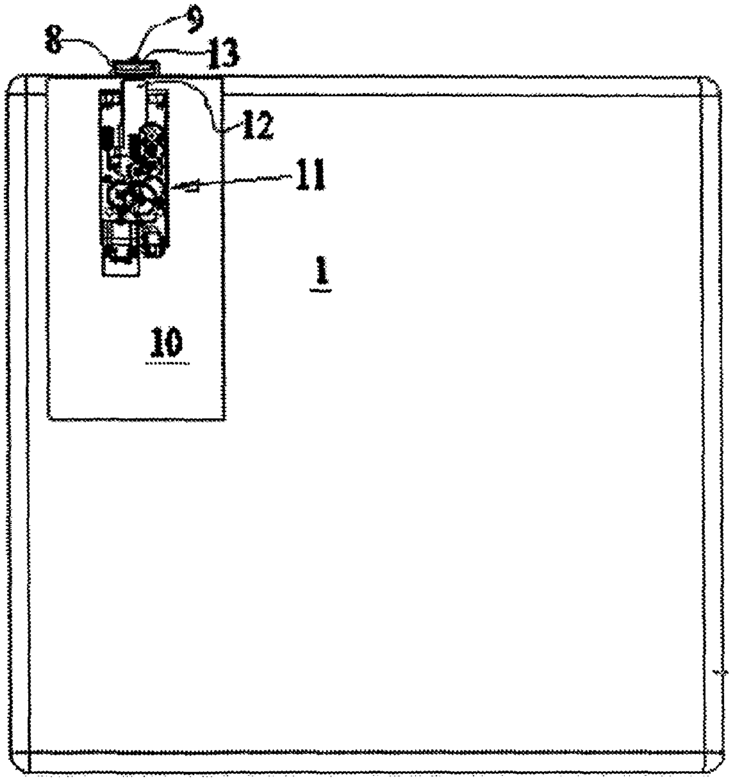
Figure 6:
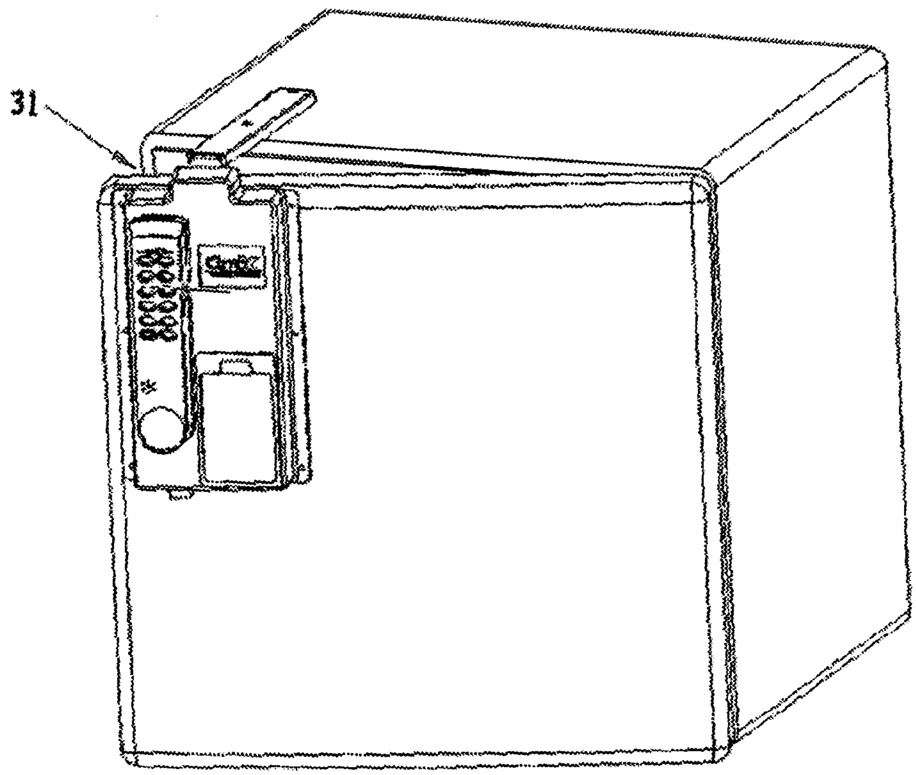
FIG. 6 is a perspective view of a refrigerator with a a present exemplary lock assembly constructed in accordance with the present subject matter installed on a exemplary door, with such door illustrated in the open and unlocked position.

With reference now to FIGS. 5*a* and 5*b*, motorized latch 11 is illustrated in the unlocked position. FIG. 5*a* is identical to FIG. 2 except the latch bolt 12 is now in the retracted position, which creates gap 30 (FIG. 5*b*) between lock bolt 12 and strike plate 13, thus allowing access to the refrigerator contents by way of the open refrigerator as further represented by gap 31 in FIG. 6.

Figure 7B:
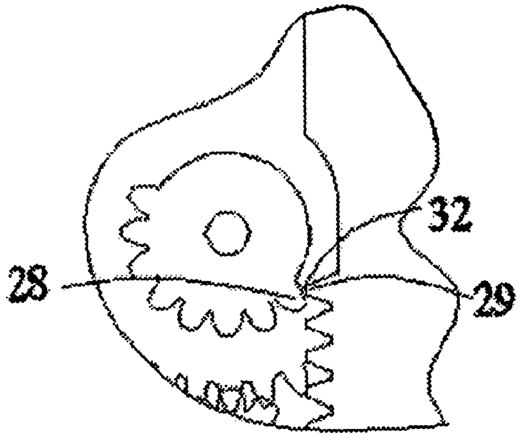
FIGS. 7*a* and 7*b* are similar to FIGS. 4*a* and 4*b*, respectively, illustrating the final pinion gear advanced and clearing the final tooth on the lock bolt rack gear, in accordance with present subject matter.
Figure 7A:
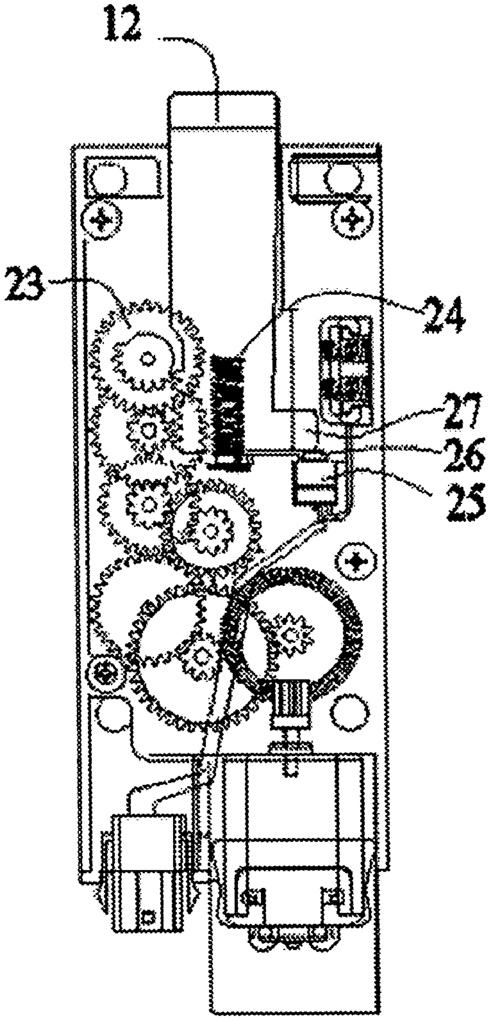
Figure 8:
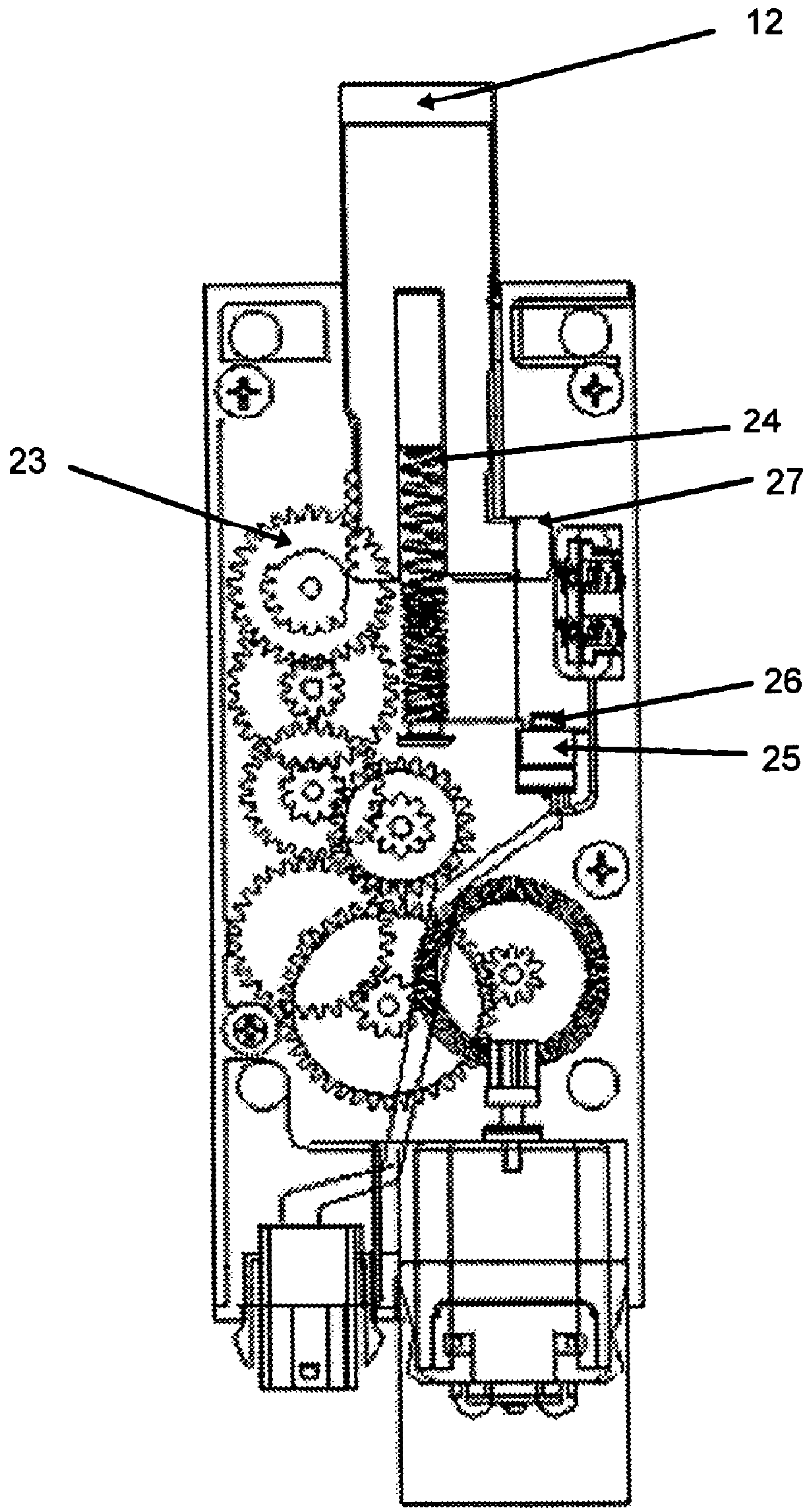
FIG. 8 is similar to FIG. 7*a*, illustrating a present exemplary lock bolt sprung back to the closed (extended) position.

With reference now to FIGS. 7*a* and 7*b*, there is illustrated the state of the lock assembly immediately following re-energization of motor 15. Final tooth 28 of gear 23 has now cleared final tooth 29 of the integral rack on latch bolt 12 creating gap 32. Since there no longer is interference between teeth 28 and 29, latch bolt 12 extends back out of motorized latch 11 by the extension of charged spring 24. Such re-locked state is illustrated in FIG. 8. It can be further noticed that latch bolt 12 is now free to travel in and out of the motorized latch, charging and re-charging spring 24.

Figure 10B:
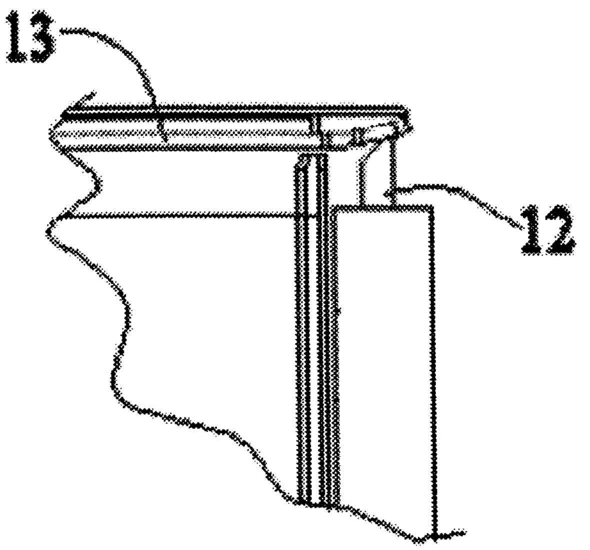
FIGS. 10*a* and 10*b* are similar to FIGS. 9*a* and 9*b*, respectively, illustrating a present exemplary lock bolt pressed in by the strike.
Figure 10A:
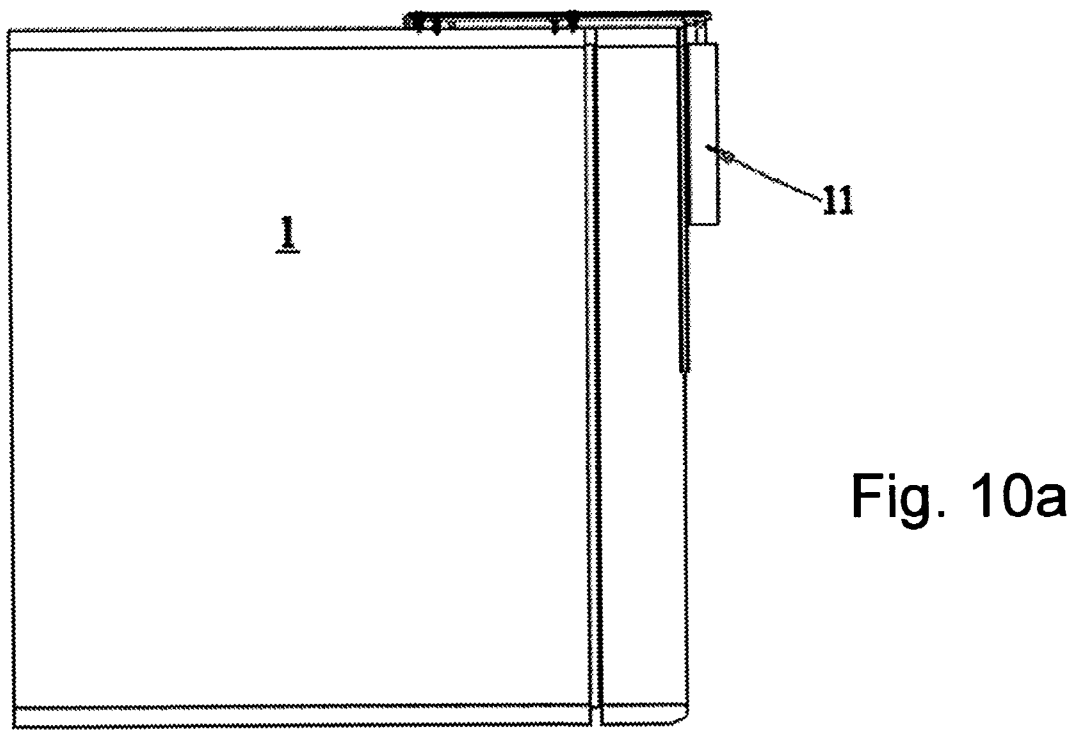
Figure 11B:
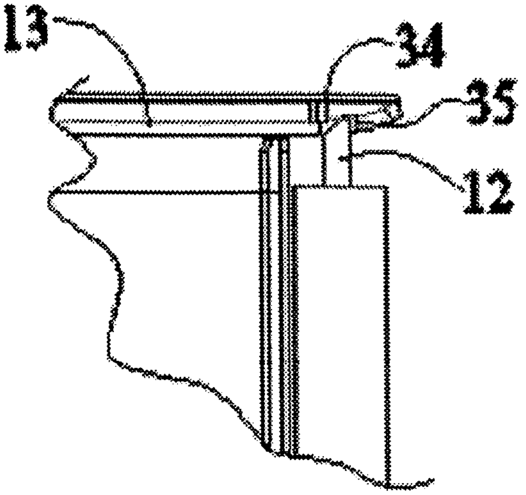
FIGS. 11*a* and 11*b* are similar to FIGS. 9*a* and 9*b*, respectively, illustrating a present exemplary lock bolt engaged in the rectangular cutout of the strike.
Figure 11A:
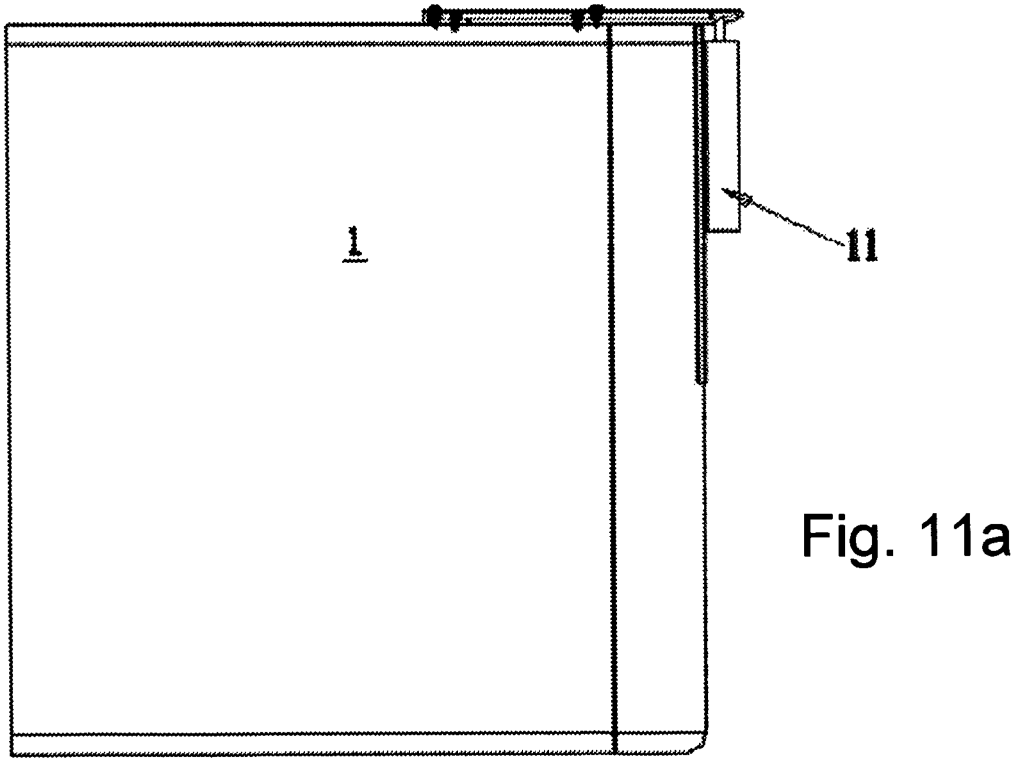

A slam to latch action is provided in accordance with the present subject matter to automatically lock the refrigerator when the person that gained access to the refrigerator closes the door. Such a door closure procedure is also substantially similar to normal refrigerator closure and thus would not require any conscience additional activities by a user to complete. The closure sequence is illustrated in FIGS. 9*a*, 9*b*, 10*a*, 10*b*, and 11*a*, 11*b*. The beginning of the latch relocking action is illustrated in FIGS. 9*a* and 9*b*. When the refrigerator door is closed, latch bolt 12 comes into contact with strike plate 13 at point 33. This contact begins to push the latch bolt 12 into the motorized latch 11 and, therefore, begins to charge spring 24. The next stage of the re-locking event is illustrated in FIGS. 10*a* and 10*b* which show latch bolt 12 further entering motorized latch 11. The final stage of the re-lock event is shown in FIGS. 11*a* and 11*b* where the latch bolt 12 enters opening 34 of strike plate 13 and the charged spring 24 causes the latch bolt 12 to extend into strike plate opening 34.

At this time, if someone tries to gain unauthorized access to refrigerator 1 by opening the door, the latch bolt will crash into the front wall of strike plate opening 34 at wall 35. Since the motorized latch 11 is connected to main housing 3 with screws 38, and main housing 3 is connected to refrigerator door with screws 7, and strike plate 13 is secured to the top of the refrigerator with screws, the door will not open.

As a further means or feature of security, main housing 3 may be provided with reinforcing feature 36 (FIG. 1) which keeps a person from gaining unauthorized access by deforming the door by pressing down on the top of the door to the extent that the latch bolt 12 would fall out of opening 34 in strike plate 13. In such condition, the strike plate cover 8 would come in contact with the internal wall of reinforcing feature 36, preventing gross deformation of the door, and therefore preventing unauthorized access.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A retrofittable lock assembly for an enclosure, said enclosure comprising an exterior portion and an access door, the retrofittable lock comprising:

a strike plate removably mountable to the exterior of said enclosure;

a housing removably mountable to said access door of said enclosure;

a latch bolt mounted in said housing and operatively configured to cooperate with said strike plate to inhibit relative movement between said strike plate and said latch bolt;

a drive motor mounted in said housing and operatively configured to retract said latch bolt into said housing to allow relative movement between said strike plate and said latch bolt;

a microprocessor mounted in said housing;

a memory mounted in said housing; and an access authorization circuit associated with said housing for receiving access authorization request data from a user, wherein data received by said access authorization circuit is verified by said microprocessor by comparing the data to a plurality of valid data sequences whereby, upon validation, said microprocessor energizes said drive motor to operate said latch bolt and stores lock operation data in said memory.

2. A lock assembly as in claim 1, wherein the access authorization circuit comprises a keypad.

3. A lock assembly as in claim 1, wherein the access authorization circuit comprises a proximity card reader.

4. A lock assembly as in claim 1, wherein the access authorization circuit is configured to be responsive to data provided by one of the group consisting of magnetic stripe cards, smart cards, RF fobs, IR fobs, iButtons, and biometric readers.

5. A lock assembly as in claim 1, further comprising a communications port coupled to the microprocessor and memory for exchanging data between the lock assembly and an external device.

6. A lock assembly as in claim 5, wherein said communications port is configured to transmit lock operation data stored in said memory to an external device.

7. A lock assembly as in claim 5, wherein said communications port is configured to receive lock operation data from an external device.

8. A lock assembly as in claim 1, further comprising a gear train coupled between said drive motor and said latch bolt.

9. A lock assembly as in claim 8, further comprising:

a rack gear positioned on the side of said latch bolt: and a spring positioned to urge said latch bolt toward an extended position, wherein said rack gear is configured for engagement with a final gear in said gear train and wherein the final gear includes a peripheral portion having no gear teeth whereby upon continued rotation of the final gear and upon reaching the peripheral portion having no gear teeth, the latch bolt is extended from the housing.

10. A lock assembly as in claim 1, wherein said strike plate and said housing are configured for retrofittable installation on an enclosure having an access door to control access to the enclosure.

11. A lock assembly as in claim 1, wherein the enclosure comprises a refrigerator for controlled medicinal products.

12. A method of controlling access to selected items, comprising the steps of:

providing an enclosure for enclosing the selected items, the enclosure including at least an exterior portion and an access door;

attaching a strike plate to the exterior portion; said strike plate being removably attachable to said exterior portion;

attaching a housing containing a latch bolt, a drive motor, a microprocessor, a memory, and an access authorization circuit to the access door; said housing being removably attachable to said access door;

programming the memory with a first predetermined plurality of code sequences;

providing a predetermined plurality of users access to at least one of the first predetermined plurality of code sequences; and storing data in the memory corresponding to user identification and date and time of access, whereby an audit trail of access to the stored items may be maintained.

13. The method of claim 12, wherein the access authorization circuit comprises a keypad and the step of providing a predetermined plurality of users access to at least one of the first predetermined plurality of code sequences comprises assigning a predetermined plurality of users at least one of the first predetermined plurality of code sequences for manual entry on the keypad.

14. The method of claim 12, wherein the access authorization circuit comprises a proximity card reader and the step of providing a predetermined plurality of users access to at least one of the first predetermined plurality of code sequences comprises assigning proximity cards to a predetermined plurality of users for presentation to the proximity card reader, the proximity cards containing at least one of the first predetermined plurality of code sequences.

15. The method of claim 12, wherein the step of providing an enclosure comprises providing a refrigerator.

16. The method of claim 12, further comprising the step of associating a communications port with the housing, the microprocessor, and the memory whereby data may be exchanged with the microprocessor and the memory and an external device.

17. Lock assembly apparatus for retrofittable use with an enclosure of the type for enclosing selected items, and including at least an exterior portion and an access door, said apparatus comprising:

a strike plate removably attachable to the exterior portion of an enclosure;

a housing removably attachable to the access door of such enclosure;

a latch bolt mounted in said housing and operatively configured to cooperate with said strike plate to inhibit relative movement between said strike plate and said latch bolt;

a drive motor mounted in said housing and operatively configured to retract said latch bolt into said housing to allow relative movement between said strike plate and said latch bolt;

a microprocessor mounted in said housing;

a memory mounted in said housing; and an access authorization circuit associated with said housing for receiving access authorization request data from a user, wherein data received by said access authorization circuit is verified by said microprocessor by comparing the data to a plurality of valid data sequences whereby, upon validation, said microprocessor energizes said drive motor to operate said latch bolt for movement of said strike plate for corresponding opening or closing of the access door of the enclosure, and said microprocessor stores lock operation data in said memory to reflect an audit trail of access to selected items enclosed in such enclosure.

18. A lock assembly apparatus as in claim 17, wherein:

said access authorization circuit comprises at least one of a keypad and a proximity card reader; and further wherein said access authorization circuit is configured to be responsive to data provided by one of the group consisting of magnetic stripe cards, smart cards, RF fobs, IR fobs, iButtons, and biometric readers.

19. A lock assembly apparatus as in claim 17, further comprising:

a communications port coupled to said microprocessor and said memory for exchanging data between the lock assembly apparatus and an external device; and wherein said communications port is configured to receive lock operation data from an external device.

20. A lock assembly apparatus as in claim 17, further comprising:

a communications port coupled to said microprocessor and said memory for exchanging data between the lock assembly apparatus and an external device; and wherein said communications port is configured to transmit lock operation data stored in said memory to an external device.

21. A lock assembly apparatus as in claim 17, further comprising a gear train coupled between said drive motor and said latch bolt.

22. A lock assembly apparatus as in claim 21, further comprising:

a rack gear positioned on the side of said latch bolt: and a spring positioned to urge said latch bolt toward an extended position, wherein said rack gear is configured for engagement with a final gear in said gear train and wherein the final gear includes a peripheral portion having no gear teeth whereby upon continued rotation of the final gear and upon reaching the peripheral portion having no gear teeth, the latch bolt is extended from the housing.

23. A lock assembly apparatus as in claim 17, wherein the enclosure comprises a refrigerator for controlled medicinal products.

* * * * *